J. VOWLES.
Wheel Cultivator.
No. 27,174.
Patented Feb. 14, 1860.
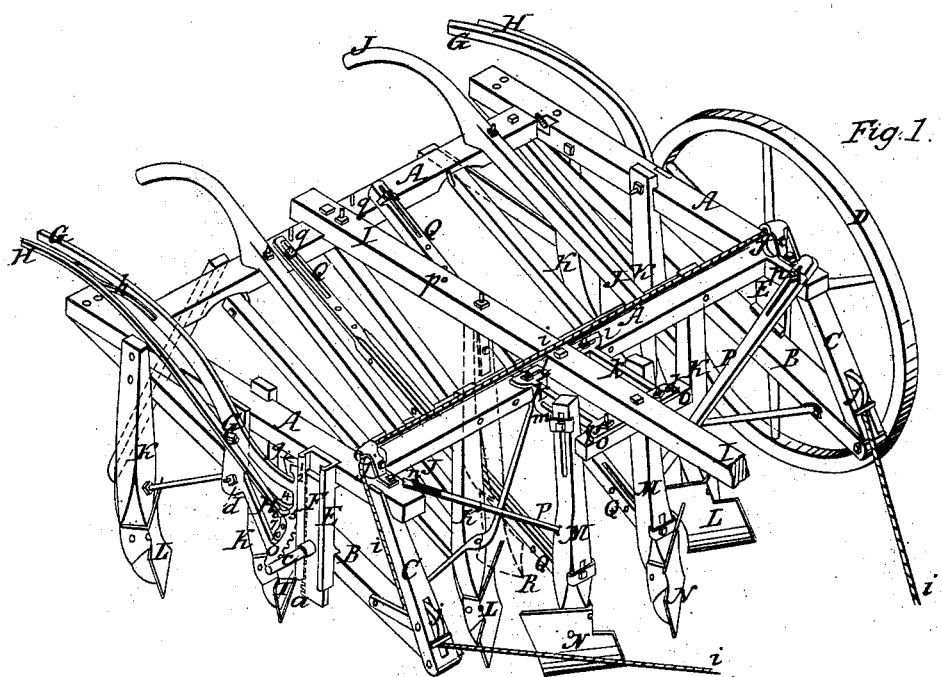
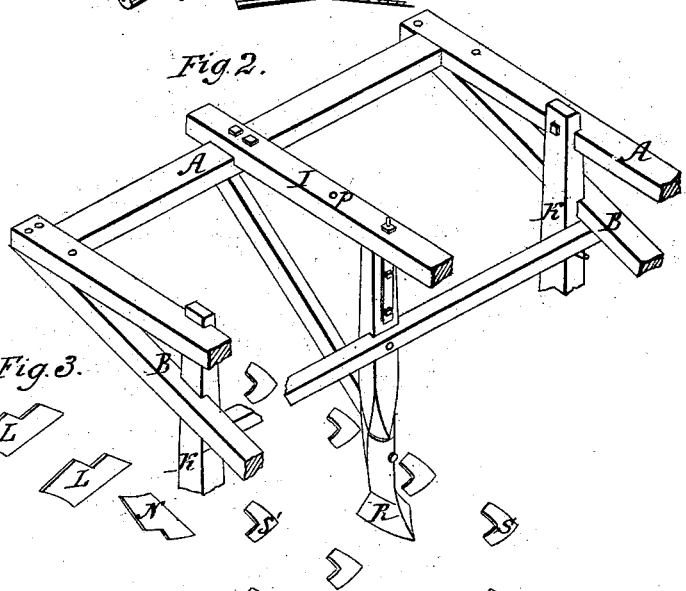
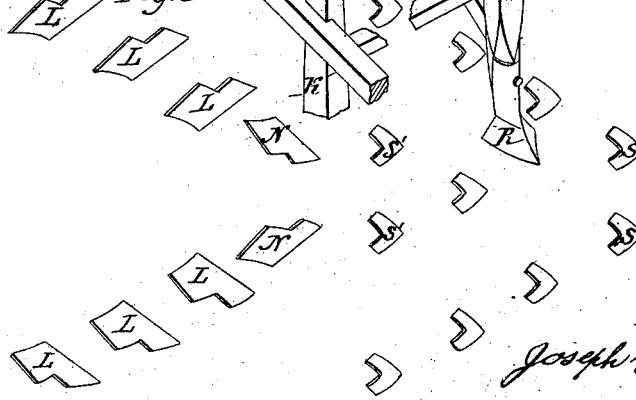

UNITED STATES PATENT OFFICE.

JOSEPH VOWLES, OF NEW HUDSON, MICHIGAN.

IMPROVEMENT IN CULTIVATORS.

Specification forming part of Letters Patent No. 27,174, dated February 14, 1860.

*To all whom it may concern:*

Be it known that I, JOSEPH VOWLES, of New Hudson, in the county of Oakland and State of Michigan, have invented a new and useful Improvement in what I term a "Combined Cultivator and Hoeing-Machine;" and I do hereby declare the following to be a full, clear, and exact description of the construction and operation of the same, reference being had to the accompanying drawings, making a part of this specification, in which—

Figure 1 represents in perspective the entire machine with the exception of one of the wheels and a portion of the tongue. Fig. 2 represents a portion of the machine which is connected to the main frame when it is used as a cultivator, parts of this being shown in red lines in Fig. 1. Fig. 3 represents certain arrangements of the hoes and cultivator-points that will be hereinafter more particularly referred to.

Similar letters of reference, where they occur in the several figures, denote like parts of the machine in all the drawings.

My invention relates to a machine which can be used for cultivating the soil as well as for hoeing corn or any other plants set out in rows, the machine being made applicable to either purpose, and widened out, narrowed, raised, or lowered, and made to throw the soil from or to the plants in measured or regulated quantities, as may be desired.

I am aware that many cultivators have been made with varieties of adjustments upon them. I of course lay no claim to such cultivators generally.

My invention consists in the manner in which I arrange and combine and adjust the hoes or cultivator-points with regard to the main frame, with a view not only of adapting it to the many purposes for which it can be used, but also for making it easy to guide, well balanced on the ground, and capable of turning around at the ends of the rows without tearing out any of the plants.

To enable others skilled in the art to make and use my invention, I will proceed to describe the same with reference to the drawings.

A A A A represent a quadrilateral frame, to which are properly secured side braces, B B, and end braces, C C, these several parts composing a strong and substantial main frame, to which all the other parts of the machine are connected or attached in various ways.

I propose sometimes to carry and support this machine on wheels D, (one only being shown in the drawings;) but it can be used without the wheels. When used with wheels metal plates E E may be bolted to the sides of the main frame, in which slides F may work, said slides having racks $a$ on one of their edges, into which a toothed segment, $b$, on the end of a lever, G, may mesh, so as to raise or lower these slides at pleasure. On these slides are fixed the journals $c$ for supporting the wheels D. The levers G have their fulcra at $d$, and then extend back to where the operator is stationed, so that he may at any time readily grasp and operate them to raise or lower the frame and its several connected parts upon the wheels. On the plates E are made a series of holes, 1, 2, 3, &c., arranged in an arc of a circle of which the point $d$ is the center, and to the lever G is pivoted a bolting-lever, H, which has a bolt, $f$, upon it, that passes through the arcs $b$ $g$, and is held there by a spring, $h$, this being for the purpose of holding the machine at its adjusted height. The levers G and H are so arranged that one or both may be grasped and operated singly or together, as may be desired.

I is the tongue by which the machine is guided. It is placed high up above the ground, so as to give as much space under the frame as possible, as the intention is to cultivate, or rather hoe, the corn as long or until it is as high as when hand-hoeing is used.

Instead of drawing the machine by the tongue or by double-trees, I use an equalizer, which prevents any sudden jerking around of the machine if the team does not draw or start evenly. This equalizer is composed of a cord, chain, or rope, $i$, passing over or around pulleys $j$ $j$ $j$ $j$, and to the ends of this rope or chain the single-trees to which the horses are hitched are fastened.

The handles J are skewed on the frame, so that the operator may walk between the rows.

The plow stocks or standards K K K are arranged *en echelon* on both sides of the main frame, with their shovels, hoes, plows, or mold-boards L parallel and facing each other inward, as shown to the left of Fig. 3, though by transposing them on the frame, of which they are made capable, they may still be parallel, but face outward, the first-named arrangement throwing the earth and soil to the center of the path of the machine, the latter arrangement reversing the operation and throwing it outward or away from the row of plants. These stocks K are properly bolted and braced to the main frame, as represented, but so that they may be removed and replaced at any time.

M M are two front stocks or standards, which carry respectively a shovel, hoe, or plow, N N, which face outward from the row of plants. These hoes N have several adjustments which are important, as they perform a very essential element in the operation of hoeing the crop. A cross-bar, O, is bolted to the tongue, and from the front cross-piece of the frame A extend two metallic plates, $k$ $k$, having slots in their flanges $l$ $l$, so that they may be adjusted on said frame-piece A and cross-bar O. To horizontal slots $m$ in these plates the stocks M M are bolted. The combined action of these adjustments are such that their hoes N may be raised or lowered, widened or contracted, so as to take less or more of the soil and run farther from or nearer to the row, as the condition of the plants may require. They are also susceptible of being moved forward or backward, so as to open or close the space between them and the next pair of hoes in rear of those which they carry for the purpose of admitting more or less soil to pass through said open space to the plants. It is obvious that these stocks M may be transposed, in which event they would cause their hoes N to throw the earth from instead of toward the plants. That these stocks M may have the necessary rigidity to withstand the resistance which they meet with in carrying their hoes, they are braced laterally by braces P, connected to them by dead-eye or other yielding connections, the other ends of said braces being slotted, so as to admit of any of the adjustments above mentioned, and when adjusted made fast by running down the nuts $n$ $n$ tight. Two other braces, Q Q, support the stocks M M in the line of the forward motion of the machine. These braces are adjustable to the stocks at one of their ends and to the rear cross-piece of the frame A by means of suitable slots, which are clearly shown in the drawings.

When the machine is used for cultivating the soil a central cultivator-tooth, R, Fig. 2, may be introduced into the machine. (This tooth and its connected pieces are shown also in red lines in Fig. 1;) but when the machine is arranged for hoeing, then this central tooth and its connected braces or supports are removed.

The condition of the crop or the soil or the special purpose for which the machine is to be used may require special kinds of hoes, shovels, teeth, or mold-boards. I do not confine myself to any special kind, as agriculturists differ as to which are the best, and I leave them to their choice. I have shown such as I prefer, however, those on the left of Fig. 3 for hoeing and those on the right of said figure for cultivating; and when cultivating I can remove the two front cultivators, $s$ $s$, to the rear, as shown by the red lines $s'$ $s'$, in which event the cross-piece O can be bolted to the tongue at $p$, the plates $k$ extend from it to the bolts $q$ $q$ on the rear cross-piece of the frame A, where they are fastened, and the braces Q turned around so that their present rear ends shall extend to the front of the frame and be fastened or adjusted there.

By such a construction and arrangement as I have described and represented I have produced an implement by which much of the hand-labor now used in growing corn can be dispensed with and be done by machinery, and done, too, equally well, if not measurably better; but the great saving is the increased quantity of ground that can be gone over when the crop most needs hoeing, as I can with this machine hoe ten acres per day.

Having thus fully described the nature and object of my invention and shown how the same may be made efficient and operative for the purpose, what I claim therein as new, and desire to secure by Letters Patent, is—

1. In combination with the series of hoes or plows L L, the pair of front hoes or plows, N N, constructed, arranged, and made adjustable in the manner and for the purpose herein described and represented.

2. The peculiar construction, combination, and arrangement of the frame, the pulleys, and the locking of the standards to the frame, substantially as described, and for the purposes set forth.

JOSEPH VOWLES.

Witnesses:
 THOS. H. UPPERMAN,
 E. COHEN.